G. HOPSON.
Manufacture of Spring-Heads.
No. 5,219. Reissued Jan. 7, 1873.
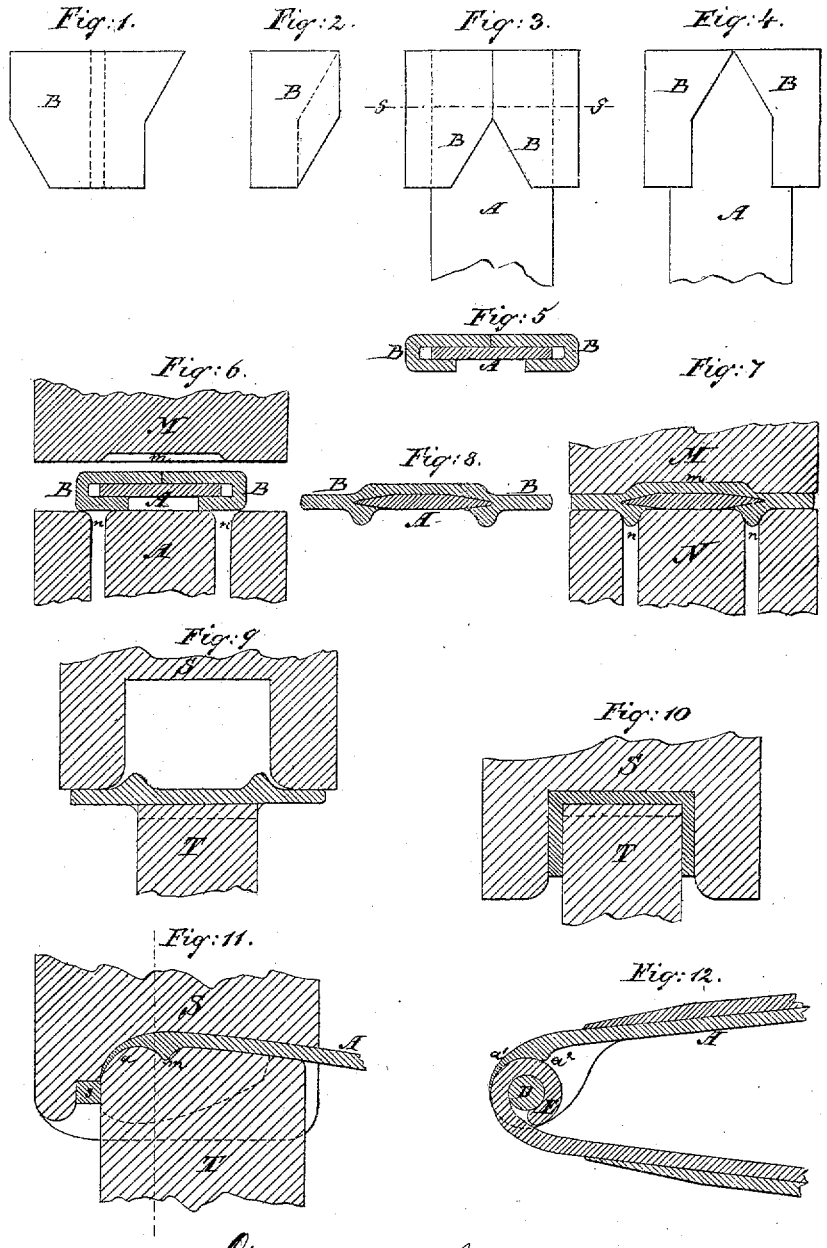
Witnesses:
Howard H. Smith
James A. Burke
George Hopson Inventor.
AM. PHOTO-LITHOGRAPHIC CO. N.Y. (OSBORNE'S PROCESS)

UNITED STATES PATENT OFFICE.

GEORGE HOPSON, OF BRIDGEPORT, CONNECTICUT.

IMPROVEMENT IN THE MANUFACTURE OF SPRING-HEADS.

Specification forming part of Letters Patent No. 116,311, dated June 27, 1871; reissue No. 5,219, dated January 7, 1873.

*To all whom it may concern:*

Be it known that I, GEORGE HOPSON, of Bridgeport, in the county of Fairfield, in the State of Connecticut, have invented certain new and useful Improvements in the Manufacture of Elliptic-SpringHeads, of which the following is a specification:

My invention relates to the construction of the ends of what I will term the female leaf at and about the point where they are joined to the opposite or male leaf.

The following is a description of what I consider the best means of carrying out the invention.

The accompanying drawing forms a part of this specification.

Figure 1 is the piece of sheet-iron properly cut to form what is termed a clip; dotted lines show the lines of folding. Fig. 2 shows the same after folding; dotted line shows the position of the further edge which is concealed. Fig. 3 shows the end of the steel leaf, with two of these iron clips properly applied. Fig. 4 shows the other or outer face of the same. Fig. 5 is a cross-section on line *s s*, Fig. 3. Fig. 6 shows the same introduced under a hammer, upon an anvil of proper form, to induce the welding and raise a cross-ridge at a point where such is important. Instead of a hammer and anvil these parts may be dies having a positive motion, and will be so described in future. Fig. 7 shows the same parts after the dies have closed together and effected the welding and the preliminary shaping. Fig. 8 shows the cross-section of the spring-head in the condition induced by these dies. Fig. 9 shows the same between the dies which fold the edges and give a final shape to the body. Fig. 10 shows the same after said dies have acted. In these two figures a certain cross-groove is indicated simply in dotted lines. The succeeding figure shows the same groove in strong lines. Fig. 11 is a longitudinal section through the spring-head and through the shaping-dies. Fig. 12 shows a longitudinal section through the finished spring-head with the eye or male part in place therein.

Similar letters of reference indicate like parts in all the figures.

The drawing represents the novel parts with so much of the ordinary parts as is necessary to indicate their relation thereto.

A is a portion of the leaf, rolled or otherwise previously produced, of steel, in the proper flat form. B B are pieces of fine tough iron, cut and folded in the form represented, and fitted on the ends of the steel so as to retain their position in the manner of clips until they are welded. Having been properly adjusted in the position shown in Fig. 3, the entire ends of the leaf A, with these pieces of iron B, having been treated with borax or other proper flux, are heated and welded together by being subjected to a quick pressure between dies M N. The lower die N may be fixed, and the upper die M worked by any suitable mechanism, which shall cause it to operate rapidly, and preferably to an exactly determined extent, so that, the parts of the mechanism being sufficiently massive to avoid any considerable springing, the thickness of the ends of the finished spring shall be very nearly uniform notwithstanding the ordinary differences in the hardness and temperature of the material treated. The die M has a cross-groove, as represented, along the line represented by *m*, and the die N has two longitudinal grooves along the lines represented by *n n*. The presence of these grooves *m n n* produces corresponding ridges in the soft material of the spring along these lines, which become important in the subsequent treatment of the material. I give the metal its final form in a separate pair of dies, S T, operated preferably in the same manner as described for the operation of the dies M N. These dies S T are so formed that after properly introducing the hot metal of the spring end or head, the operation of the dies in closing together folds the projecting portions of the iron clips B B into planes at right angles to the main face of the spring A, and also folds or bends the extreme end $a^1$ of the spring, and thins it in the manner represented, and by means of a cross-groove in the die T, which I will also mark *m*, swages the metal of the cross-ridge $a^2$ on the inner face of the spring-head into exactly the proper form. It is desirable to produce a ridge on the inner face of the spring to form the inner boundary of the socket or partially cylindrical cavity *a*, which receives the curl or eye at the end of the opposite or male leaf. This curl is represented by E in Fig. 12, and, it will be understood, curls as usual around the bolt D, which is employed to hold the leaves of the finished spring in their proper positions. The metal of this ridge or stop $a^2$ is raised into nearly its proper form, by reason of the groove *m* in the die M, previously described. Now, the dies S T, being properly formed and mounted, induce not only the bending or folding the edges B B of the widened metal into their proper positions at right angles to the plane of the leaf A, and the bending also of the end $a^1$ of the spring into the right position, but also, by means of a steel-edged piece or cutter, *s*, mounted in the die S, shaves off the superfluous metal at the extreme end, and finishes the entire exterior into the exact form or a very close approximation to the exact form. It also, by the same operation, produces the proper partially-cylindrical cavity *a* upon the inner face of the leaf striking up the stop $a^1$ on the outer side, and the stop $a^2$ on the inner side, adapted each to bear in the proper position on the eye E of the other part of the spring.

It will be observed that the clips B are cut in such a form that on folding them upon themselves to apply upon the edges of the metal A, their edges are not opposite to each other, but describe different lines. This condition is very clearly shown by the strong and dotted lines in Fig. 2. I attach importance to this point, inasmuch as the edges, if superposed directly over each other, would introduce a weak line in the metal along the junction of the iron and steel. The cutting the edges in the form described divides the weakening effect of the welding, and also provides a liberal quantity of soft iron on the inner face of the spring-head to form the ridge which extends across, and the convenient production of which forms an important part of my invention.

The operation may be further refined by scarfing or chamfering the edges of the iron parts so as to lessen the weakening effect or the welding by lessening the distortion of the steel at the point where the edge of the iron lies. But this involves an expense which I believe to be unnecessary in practice, even for the manufacture of the highest-priced springs.

My invention greatly facilitates and cheapens the manufacture of springs, and aids to insure a high degree of uniformity in the size and quality of the product. Leaves of any given section may of course be made of various lengths with the same dies; and leaves of the same width, but differing in thickness, may be accommodated by simply changing the closeness with which the dies M N and the dies S T are forced together, which may be effected by stout adjusting-screws or analogous means. To accommodate leaves of different widths I provide other sets of dies M N and S T. Any fin or other imperfection remaining after the treatment may be removed by proper milling-tools, or by ordinary chipping and filing, grinding, &c.

The outline or contour of the edge of the folded portion of the leaf A and clips B may be produced or corrected by properly milling or cutting with dies, or by filing, or other ordinary or suitable means, after the other work is completed.

An additional piece of iron may be laid upon the spring along the line corresponding to the groove *m*, and welded thereon to still better fill the groove *m* and raise the proper ridge on the spring; but I do not esteem such a step usually necessary or desirable.

Some of the advantages due to certain features of the invention may be separately enumerated. First, by reason of the fact that the die T, operated in connection with the die S, is formed with a cross-groove or recess, *m*, I am able to rapidly and economically strike up by the dies a stop or lateral bearing on that side of the cavity which receives the male part or filler E of the spring; second, by reason of the welding of the clips B and the imprinting of ribs longitudinally and transversely on the two faces of the spring-head by the previous dies M N, in connection with the bending of the projecting parts of the clips to form the ears by the dies S T, which form the inner face of the spring, I am able to rapidly and perfectly form the entire head by dies; third, by reason of the fact that the clips B extend across on the inner face, I am able to supply abundant iron for the subsequent filling of the groove or recess *m* in the finishing-die T; fourth, by reason of the formation of the clips B with the lines or edges on the inner face standing in different positions from the edges on the other face, I avoid the weakening which would be due to the indentations of the steel with coincident shoulders on the two faces.

I claim as my invention—

1. The within-described method of forming the ridge or stop $a^2$ on the inner face of the female head by means of the die T with its recess *m* in connection with the die S, as shown and described.

2. The within-described method of welding the clips to the spring, forming the several projecting ribs thereon and imparting to the spring-head the proper finished shape by the dies M N and S T, as described.

3. The extension of the clips B across the inner face of the spring, as shown.

4. The clips B, of the shape described, jointly with the implacement and attachment of them to the leaf A, as described.

In testimony whereof I have hereunto set my hand and seal this 12th day of December, 1872, in the presence of three subscribing witnesses.

GEO. HOPSON. [L. S.]

Witnesses:
E. B. STEVENS,
HOWARD H. SCRIBNER,
JAMES A. BURKE.